(12) United States Patent
Rabe et al.

(10) Patent No.: US 8,954,880 B1
(45) Date of Patent: Feb. 10, 2015

(54) USER INTERFACE HAVING USER-CUSTOMIZED DEFAULT VALUES

(71) Applicants: Bruce R. Rabe, Dedham, MA (US);
Scott E. Joyce, Foxboro, MA (US);
Norman Miles, Bedford, MA (US)

(72) Inventors: Bruce R. Rabe, Dedham, MA (US);
Scott E. Joyce, Foxboro, MA (US);
Norman Miles, Bedford, MA (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 13/630,445

(22) Filed: Sep. 28, 2012

(51) Int. Cl.
*G06F 3/0482* (2013.01)

(52) U.S. Cl.
USPC .................. 715/780; 715/765; 715/810

(58) Field of Classification Search
CPC . G06F 3/0481; G06F 9/44543; G06F 3/0237; G06F 17/243; G06F 3/0482
USPC .................. 715/700, 764, 765, 780, 810
See application file for complete search history.

(56) References Cited

U.S. PATENT DOCUMENTS

| | | | |
|---|---|---|---|
| 7,904,821 B1 * | 3/2011 | Tertitski et al. | 715/762 |
| 2006/0274364 A1 * | 12/2006 | Hasseler | 358/1.15 |
| 2008/0010516 A1 * | 1/2008 | Lu | 714/15 |
| 2009/0007009 A1 * | 1/2009 | Luneau et al. | 715/808 |

FOREIGN PATENT DOCUMENTS

WO    2007074067 A1    7/2007

* cited by examiner

*Primary Examiner* — Xiomar L Bautista
(74) *Attorney, Agent, or Firm* — BainwoodHuang

(57) ABSTRACT

A method of operating a graphical user interface employs an input control enabling a user to provide an input value for a field. The method includes, during a first period of use of the graphical user interface by the user, automatically presenting a predetermined first input value as a default input value for the field. This may be a system default value for example. During the first period, the values provided by the user are monitored to identify a distinct second input value receiving at least a threshold use by the user. Then during a subsequent second period, based on the threshold use of the second input value during the first period, the second input value is automatically presented as the default input value for the field.

20 Claims, 5 Drawing Sheets

USER INTERFACE HAVING USER-CUSTOMIZED DEFAULT VALUES

BACKGROUND

The invention is related to the field of user interfaces, and in particular to graphical user interfaces providing input controls by which a user supplies input values to a computer system.

It is common for computer systems to employ default values for variables or parameters that are settable by a user. For example, a graphical user interface may include a control such as a pull-down menu that a user can operate to select a value to provide as input to a program or service. If there is a preferred or most commonly used value for this input, this value may be identified as a "default" and shown as the contents of the control when the interface screen is first presented to the user. Unless the user selects another value, effectively overriding the default value, the default value will be submitted with other contents of the screen as the relevant input to the program or service.

SUMMARY

While it can be very useful to employ default values to enable faster and/or more efficient use of a graphical user interface, they do not always necessarily achieve this effect. For example, a designer or system administrator might make certain assumptions and arrive at a corresponding system default value that makes most sense based on those assumptions, but in any particular environment or use the assumptions may not be applicable or there may be other overriding factors such that the system default value is seldom or ever used. For such situations, it would be desirable for default values to adapt based on usage history, so that efficient operation can be obtained over a broader range of use cases.

The present disclosure is directed to a method of operating a graphical user interface that employs an input control enabling a user to provide an input value for a field. The method includes, during a first period of use of the graphical user interface by the user, automatically presenting a predetermined first input value as a default input value for the field. This may be a system default value for example. During the first period, the values provided by the user are monitored to identify a distinct second input value receiving at least a threshold use by the user. Then during a subsequent second period, based on the threshold use of the second input value during the first period, the second input value is automatically presented as the default input value for the field.

By the above technique, the default behavior of a user interface tracks the manner of usage by the user, and the user can make more efficient use of the screens especially when performing the same task several times. In one specific type of use, the increased efficiency may be realized by a storage system administrator configuring a number of devices or objects in a data storage system. The technique can be used in a number of different types of systems and services.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
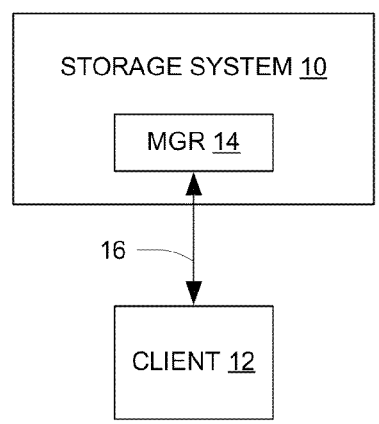
FIG. 1 is a block diagram of a system including a storage system and a remote management client.

FIG. 1 shows a simplified data processing system having a storage system 10 and a management client or "client" 12. The storage system 10 generally includes a set of storage devices such as disk drives, high-speed external connections such as gigabit-Ethernet (GbE) or FibreChannel connections, and processing circuitry executing operating software that provides a number of functions as generally known in the art. Common functions include data protection functions such as RAID, etc. As shown, the operating software also includes a system management function (MGR) 14, referred to as the "management function" herein. In the illustrated embodiment, the management function 14 communicates with system administrator by providing a graphical user interface (GUI) over a communications channel 16 to the management client 12. Although shown as a direct connection, the communications channel 16 may be a logical channel through a network such as generally known in the art. For example, the channel 16 may include a so-called Secure Socket Layer (SSL) connection or similar secure, point-to-point logical channel carried on an Internet Protocol (IP) transport. Additionally, the channel 16 may carry GUI-related communications using higher level protocol such as Hypertext Transfer Protocol (HTTP), etc., also as generally known in the art.

Figure 2:
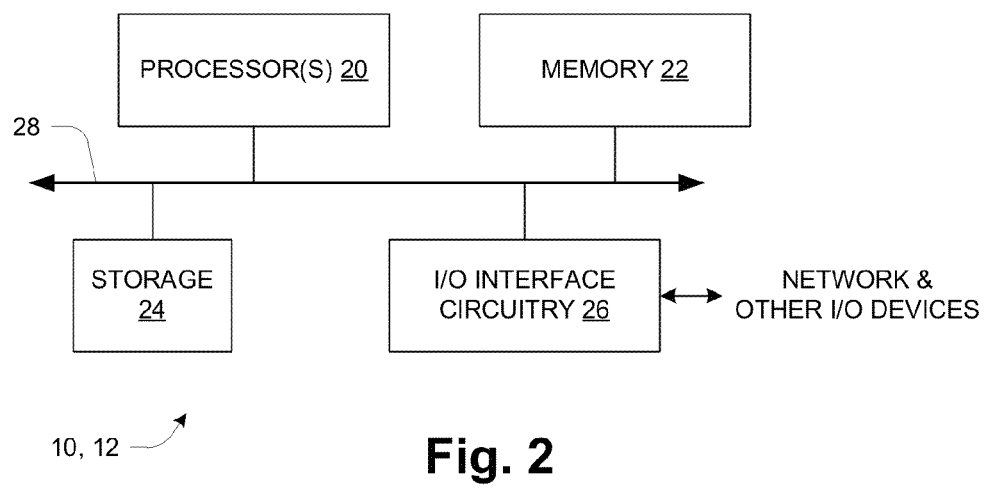
FIG. 2 is a hardware block diagram of a computer.

FIG. 2 is a generalized depiction of a computer such as may be used to realize the storage system 10 and management client 12. It includes one or more processors 20, memory 22, local storage 24 and input/output (I/O) interface circuitry 26 coupled together by one or more data buses 28. The I/O interface circuitry 26 couples the computer to one or more external networks, additional storage devices or systems, and other input/output devices as generally known in the art. In the present context, the client 12 is assumed to include user interface components such as a graphical display and one or more user input devices (not shown) such as the display itself (i.e., a touch screen), a mouse or similar hardware pointer/selector, a hardware or software keyboard, etc. System-level functionality of the computer is provided by the hardware executing computer program instructions (software), typically stored in the memory 22 and retrieved and executed by the processor(s) 20. Any description herein of a software component performing a function is to be understood as a shorthand reference to operation of a computer or computerized device when executing the instructions of the software component. Also, the collection of components in FIG. 2 may be referred to as "processing circuitry", and when executing a given software component may be viewed as a function-specialized circuit, for example as a "mapping circuit" when executing a software component implementing a mapping function. It will be appreciated that the storage system 10 of FIG. 1 may have a more specialized hardware organization supporting a number of storage devices, high-speed interfaces, redundancy hardware, etc. as generally known in the art.

Figure 3:
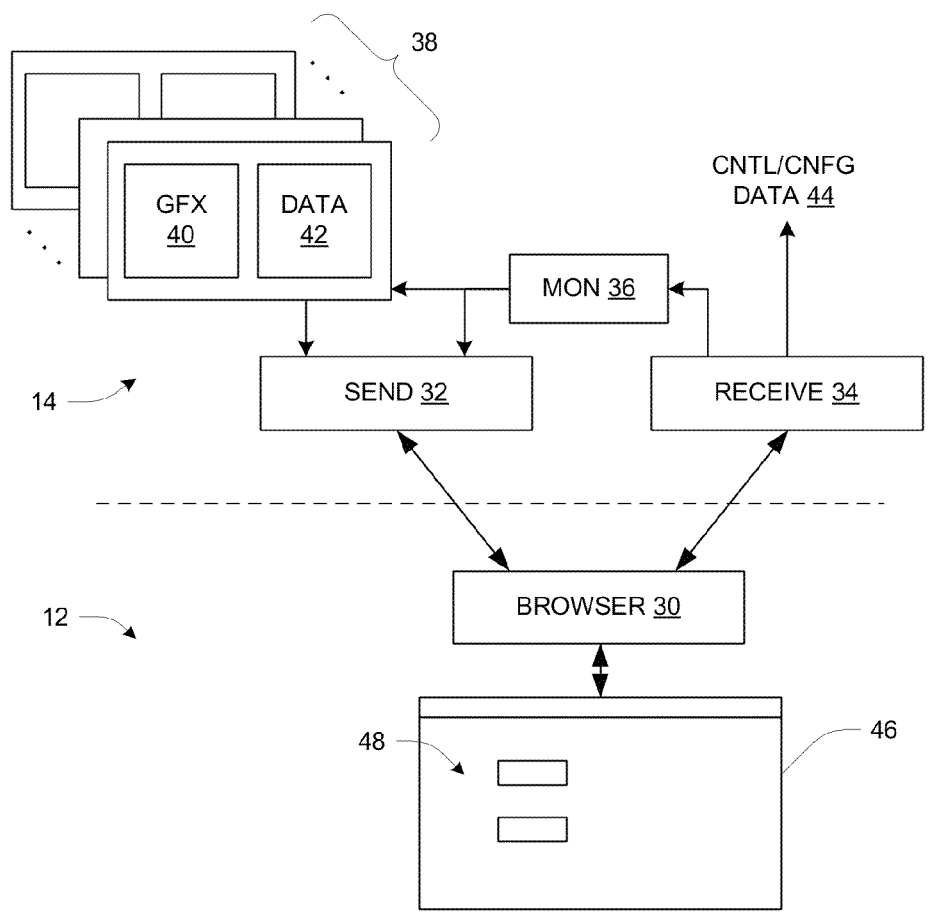
FIG. 3 is a block diagram of software components of the storage system and client.

FIG. 3 illustrates software components of the system manager 14 and management client 12. In this case the above-discussed GUI is presented using web-oriented technology including a browser 30 in the client 12 and server functionality in the system manager 14. Specifically, the system manager 14 includes a send component 32, a receive component 34, and a monitoring component 36. The send component 32 is responsible for delivering web pages 38 that collectively constitute the GUI. As shown, each web page 38 generally includes data (GFX 40) describing the graphics for the page and other data (DATA 42) used to populate data-containing graphical elements of the page, such as tables, headings, user controls, etc. As described more below, the receive component 34 obtains user input data from the browser 30 and makes it available as control and configuration (CNTL/CNFG) data 44 to other components (not shown) of the storage system 10. Functionality of the monitoring component 36 is also described below. The depiction of the send component 32, receive component 34 and monitoring component 36 as distinct components is for ease and clarity of description. They represent associated functionality of the system manager 14 as described herein, and in any particular implementation may or may not correspond to separate modules, libraries or other typical software building blocks. For example, in an object-oriented implementation there may be pieces of send, receive and/or monitoring functions distributed among a number of different objects.

Also shown in FIG. 3 is a rendered web page 46 as created on a display of the client 12 by the browser 30 based on the content of a corresponding web page 38. As shown, the rendered page 46 includes two user input controls 48 via which a human user provides selections or keyed-in values that are communicated to the receive component 34 during operation. This communication may occur by action of a control that "submits" the page, as generally known in the art.

In operation, the send component 32 delivers web pages 38 to the browser 30 based on their logical organization and activity of the user. For example, there may be a "landing page" delivered first in a session, followed by sets of one or more pages based on either a predetermined sequence or based on user navigation. One example of a sequence is a so-called "wizard", an ordered set of pages for multi-step user input for a task. In the context of a storage system 10, wizards might be used for tasks such as defining RAID groups or consistency groups, provisioning storage for dedicated hosts such as database or mail servers, creating storage pools, virtual volumes, etc. A user interacts with each rendered page 46, for example by making selections or entering information as well as activating controls to cause input to be captured and to navigate to other pages. The browser 30 sends input data and selections to the receive component 34, which communicates the values to other components that make operational use of the values. For example, a user selection of a RAID level, for example, may be provided (as control configuration data 44) to a RAID controller that operates a RAID group accordingly.

Some of the input controls (e.g., selectors or input boxes) of the web pages 38 may include default values, i.e., a value that is already selected or entered on the page when rendered and serving as the input value for the input control in the absence of any selection or input by the user. Examples are given below. A distinction may be made between system default values and customizable default values, which may be user-specific (i.e., the system may apply monitoring and customization for each of a set of users, so that at any given time the users may receive different default values when using a page). The identification (or actual values) of default values forms part of the data 42 of a web page 38. It will be appreciated that a system default value is generally static, and may require an offline updating of the web page 38 such as by a system administrator. As described more below, customizable default values are identified or created dynamically during operation, through action of the monitoring component 36.

Figure 4:
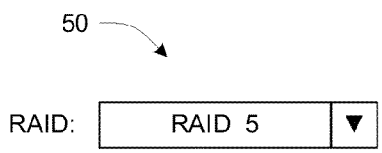
FIGS. 4-6 are depictions of an input control (menu box) of a graphical user interface.
Figure 5:
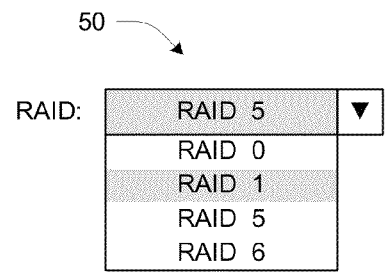
Figure 6:
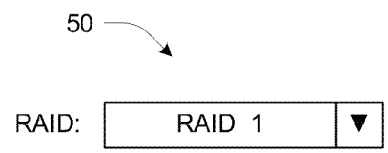

FIGS. 4-6 illustrate an example of a user control and a default selection. The control is in the form of a drop-down menu box 50 of the type generally known in the art. The menu box 50 provides for selecting a RAID level to be used in operating a unit of storage, where the selection options are RAID 0, RAID 1, RAID 5 and RAID 6. Referring to FIG. 4, when the web page containing the menu box 50 is initially presented and rendered, a system default selection of RAID 5 is shown. If the page were to be submitted at this point, then RAID 5 would be provided as control/configuration data 44 for use by a RAID controller and/or other components.

In this example, the user desires to select RAID 1 instead of RAID 5. FIG. 5 shows an intermediate point in the user interaction, when the user has activated the control (e.g., by clicking on the down arrow) and highlighting the RAID 1 item in the list (e.g., by hovering a cursor). When this item is selected (e.g., by clicking on it), it becomes the selection, as shown in FIG. 6. If the web page is submitted at this point, then RAID 1 is provided as control/configuration data 44 for use by the RAID controller and/or other components of the storage system 10.

The sequence of FIGS. 4-6 is an example of a user overriding a default value that is provided for the control (e.g., menu box 50) when a web page is displayed. In conventional GUIs, any such overriding is limited in effect to a particular interaction with a particular page. For example, if a storage administrator were creating a number of RAID groups and using a dialog or wizard for each one, the control would always initially be displayed with the system default RAID 5 and the user would be required to make the selection of RAID 1 for each RAID group. The selection of RAID 1 on a wizard page for one RAID group would have no effect on operation of the same wizard page for another RAID group.

In operation of the system manager 14, the monitoring component 36 monitors or tracks user input selections or values and uses them to modify the content/behavior of web pages 38 in subsequent uses. This monitoring and modifying may take a variety of forms. In one simple example, a user selection in a particular use of a page (e.g., one pass through a wizard) is remembered and used as the default in the next use of the page (next pass through the same wizard). More generally, the monitoring component 36 looks for the user's overriding of the present default value (which may be the system default value) some threshold number of times. There may be tradeoffs in the selection of the threshold. A smaller value such as one or two provides for faster adjustment to a new input pattern, while a larger value (three or more) may be useful if a stickier default is desired.

Continuing with the example of FIGS. 4-6, in a conventional approach the web page containing the menu box 50 would be presented in a subsequent dialog/pass in the same manner as shown in FIG. 4, i.e., the same as the first dialog/pass and presenting the system default value RAID 5. In the dynamic approach, the web page is presented in the subsequent dialog/pass in the same manner as shown in FIG. 6, i.e., with the previously selected value of RAID 1 as the default value. By this dynamic adjustment of the default value, a user desiring to make multiple uses of the same value is not required to operate the menu box 50 to override the system default value. Instead, the desired value appears as the default value, enabling more efficient use of the page for user input.

While the above example employs a menu box 50 and a (generally fixed) set of predetermined values to select from, the technique may also be used with other controls such as input boxes by which a user can enter more custom values. In one example, an input box may be provided for the user to specify the size of a LUN to be provisioned, for example as an integer number of blocks. In this case, any default value will be one number and it may be overridden using any of a potentially large set of numbers. For example, if up to six digits may be entered, then $10^6$ different values may be possible. Here a good approach may be to use the most recently entered override value as the new default in a subsequent use. For example, if the system default is 10,000 but the user has just used a value of 12,000, the new default value could be made to be 12,000.

Figure 7:
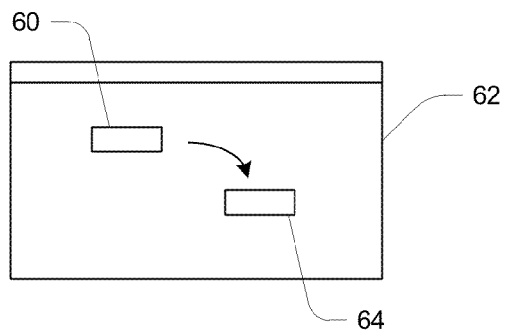
FIGS. 7-8 are depictions of user interface screens with input controls.
Figure 8:
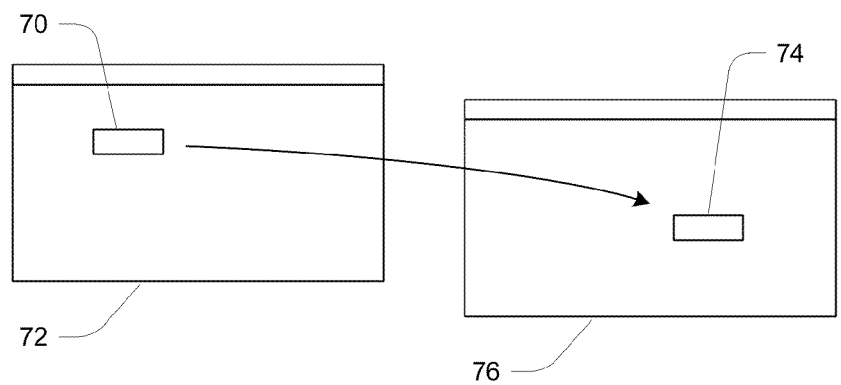

FIGS. 7-8 illustrate other example of monitoring user input and adjusting default values. FIG. 7 illustrates a case in which a user's selection or input in one control 60 of a page 62 may affect the default value or selection for another control 64 on the same page. In this case, the logic for such behavior might be encoded into the web page so that the browser 30 can update the page without requiring any submission or other notification to the system manager 14. FIG. 8 illustrates a case in which a user's selection or input in a control 70 on one page 72 affects the default value or selection for a control 74 on another page 76 that follows the first page 72 in sequence.

Figure 9:
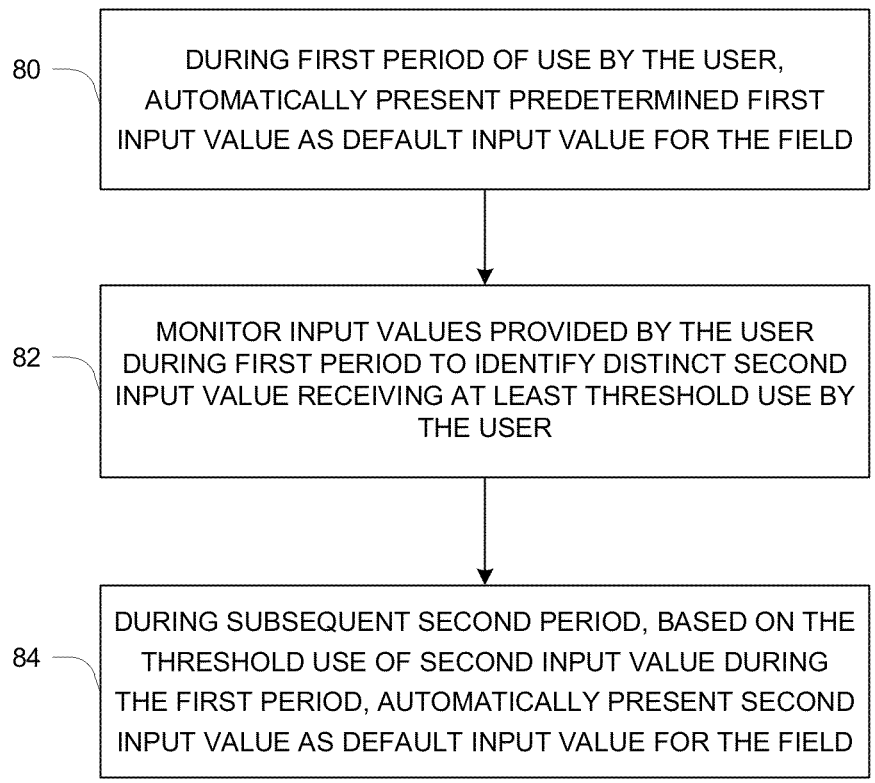
FIG. 9 is a flow diagram of a method of customizing default values based on user behavior.

FIG. 9 is a flow diagram of the general operation pertaining to the customization of default values as described herein. In many cases this operation involves action of the server-side monitoring component 36, but as indicated it may also be performed locally by a script or similar mechanism in the browser 30.

At 80, during a first period of use of the graphical user interface by the user, a predetermined first input value is presented as a default input value for a field of the interface, where "field" refers to the underlying variable for the control (such as RAID level, for example) that serves as the control/configuration data 44. As mentioned, the first period of use may be as short as one immediately preceding use of a web page.

At 82, the monitoring component 36 (or similar mechanism) monitors input values provided by the user during the first period to identify a distinct second input value that receives at least a threshold use by the user. In one example the threshold use may be just one immediately preceding use; in other cases some other threshold criteria may be applied.

At 84, during a subsequent second period, based on the threshold use of the second input value during the first period, the second input value is automatically presented as the default input value for the field. This operation may continue indefinitely (for example, until the default is changed by subsequent threshold use of a value other than the second input value), or it may have some finite duration based on any of a number of criteria, such as time, number of uses of the web page, etc.

Although in the above description operation is described with reference to a storage system, it will be appreciated that the disclosed techniques are more generally applicable to computer systems and applications of various types. Additionally, while the above description presents operation based on behavior of a specific user, some of the techniques used to determine how defaults adapt may be based on user role, time of day and location, for example. A key benefit is, in the event that a primary user (e.g., current expert) is unavailable, other users would be provided with appropriate default values for the current environment.

More generally, while various embodiments of the invention have been particularly shown and described, it will be understood by those skilled in the art that various changes in form and details may be made therein without departing from the scope of the invention as defined by the appended claims.

What is claimed is:

1. A method of operating a graphical user interface having an input control enabling a user to provide an input value for a field, comprising:
    during a first period of use of the graphical user interface by the user, automatically presenting a predetermined first input value as a default input value for the field;
    monitoring input values provided by the user during the first period to identify a distinct second input value receiving at least a threshold use by the user; and
    during a subsequent second period, based on the threshold use of the second input value during the first period, automatically presenting the second input value as the default input value for the field.

2. A method according to claim 1, wherein:
    the input control is a selection control enabling a user to select from a set of predetermined input values;
    the predetermined first input value is a first selection from the set of predetermined input values;
    monitoring includes monitoring selections made by the user using the selection control; and
    the second input value is a distinct second selection from the set of predetermined input values.

3. A method according to claim 1, wherein:
    the input control is an input box enabling a user to enter a keyed-in value;
    the predetermined first input value is a system default value presented when no other input value has received the threshold use during the second period; and
    monitoring includes recording one or more distinct input values keyed in by the user.

4. A method according to claim 1, wherein the first predetermined input value is a system default value presented when no other input value has received the threshold use.

5. A method according to claim 1, wherein the first period is a period over which the input control is used a predetermined number of times.

6. A method according to claim 5, wherein the predetermined number of times is one.

7. A method according to claim 1, wherein the input control is a first input control collocated on an interface page with a second input control, the second input control having a distinct third input value as a default input value for a second field, and further including:
    during the second period, based on the use of the second input value during the first period, automatically presenting a distinct fourth input value as the default input value for the second field.

8. A method according to claim 1, wherein the input control is a first input control located on a first interface page, and the graphical user interface includes a second input control on a second interface page, the second interface page following the first interface page in a presentation sequence, and the second input control having a distinct third input value as a default input value for a second field, and further including:
    during the second period, based on the use of the second input value during the first period, automatically presenting a distinct fourth input value as the default input value for the second field using the second input control.

9. A computer, comprising:
one or more processors;
memory;
input/output interface circuitry; and
interconnection circuitry coupling the processors, memory and input/output interface circuitry together for data transfer therebetween,
the memory storing computer program instructions executable by the processors to cause the computer to perform a method of operating a graphical user interface having an input control enabling a user to provide an input value for a field, the method including:
during a first period of use of the graphical user interface by the user, automatically presenting a predetermined first input value as a default input value for the field;
monitoring input values provided by the user during the first period to identify a distinct second input value receiving at least a threshold use by the user; and
during a subsequent second period, based on the threshold use of the second input value during the first period, automatically presenting the second input value as the default input value for the field.

10. A computer according to claim 9, wherein:
the input control is a selection control enabling a user to select from a set of predetermined input values;
the predetermined first input value is a first selection from the set of predetermined input values;
monitoring includes monitoring selections made by the user using the selection control; and
the second input value is a distinct second selection from the set of predetermined input values.

11. A computer according to claim 9, wherein:
the input control is an input box enabling a user to enter a keyed-in value;
the predetermined first input value is a system default value presented when no other input value has received the threshold use during the second period; and
monitoring includes recording one or more distinct input values keyed in by the user.

12. A computer according to claim 9, wherein the first predetermined input value is a system default value presented when no other input value has received the threshold use.

13. A computer according to claim 9, wherein the first period is a period over which the input control is used a predetermined number of times.

14. A computer according to claim 13, wherein the predetermined number of times is one.

15. A computer according to claim 9, wherein the input control is a first input control collocated on an interface page with a second input control, the second input control having a distinct third input value as a default input value for a second field, and wherein the method further includes:
during the second period, based on the use of the second input value during the first period, automatically presenting a distinct fourth input value as the default input value for the second field.

16. A computer according to claim 9, wherein the input control is a first input control located on a first interface page, and the graphical user interface includes a second input control on a second interface page, the second interface page following the first interface page in a presentation sequence, and the second input control having a distinct third input value as a default input value for a second field, and wherein the method further includes:
during the second period, based on the use of the second input value during the first period, automatically presenting a distinct fourth input value as the default input value for the second field using the second input control.

17. A non-transitory computer readable medium having computer program instructions recorded thereon, the computer program instructions being executable by a computer to cause the computer to perform a method of operating a graphical user interface having an input control enabling a user to provide an input value for a field, the method including:
during a first period of use of the graphical user interface by the user, automatically presenting a predetermined first input value as a default input value for the field;
monitoring input values provided by the user during the first period to identify a distinct second input value receiving at least a threshold use by the user; and
during a subsequent second period, based on the threshold use of the second input value during the first period, automatically presenting the second input value as the default input value for the field.

18. A non-transitory computer readable medium according to claim 17, wherein:
the input control is a selection control enabling a user to select from a set of predetermined input values;
the predetermined first input value is a first selection from the set of predetermined input values;
monitoring includes monitoring selections made by the user using the selection control; and
the second input value is a distinct second selection from the set of predetermined input values.

19. A non-transitory computer readable medium according to claim 17, wherein:
the input control is an input box enabling a user to enter a keyed-in value;
the predetermined first input value is a system default value presented when no other input value has received the threshold use during the second period; and
monitoring includes recording one or more distinct input values keyed in by the user.

20. A non-transitory computer readable medium according to claim 17, wherein the first period is a period over which the input control is used a predetermined number of times.

* * * * *